(12) United States Patent
Schmidt et al.

(10) Patent No.: US 7,704,025 B2
(45) Date of Patent: Apr. 27, 2010

(54) APPARATUS AND METHOD FOR SUPPORTING A SEMI-TRAILER ON A RAILCAR

(75) Inventors: Kenneth D. Schmidt, St. Charles, MO (US); James C. Hammonds, St. Peters, MO (US)

(73) Assignee: American Railcar Industries, Inc., St. Charles, MO (US)

( * ) Notice: Subject to any disclaimer, the term of this patent is extended or adjusted under 35 U.S.C. 154(b) by 494 days.

(21) Appl. No.: 11/457,936

(22) Filed: Jul. 17, 2006

(65) Prior Publication Data

US 2008/0014039 A1    Jan. 17, 2008

(51) Int. Cl.
*B60P 7/08* (2006.01)
(52) U.S. Cl. .............................. 410/59; 410/58; 410/64
(58) Field of Classification Search .................. 410/56, 410/58, 59, 60, 61, 63, 64; 280/433, 434; 105/355, 363; 248/165, 421, 434, 439, 145.6
See application file for complete search history.

(56) References Cited

U.S. PATENT DOCUMENTS

| | | | |
|---|---|---|---|
| 3,353,505 A | 11/1967 | Rollins et al. | |
| 3,356,043 A * | 12/1967 | Rollins | 410/59 |
| 3,434,683 A | 3/1969 | Rollins | |
| 3,497,169 A * | 2/1970 | Enochian | 410/60 |
| 4,074,633 A | 2/1978 | Hicks, Jr. et al. | |
| 4,185,564 A | 1/1980 | Stoller et al. | |
| 4,193,350 A | 3/1980 | Niggemeier et al. | |
| 4,216,726 A | 8/1980 | Stoller et al. | |
| 4,221,397 A | 9/1980 | Holt | |
| 4,225,276 A | 9/1980 | Stoller et al. | |
| 4,230,430 A | 10/1980 | Stoller et al. | |
| 4,230,431 A | 10/1980 | Stoller et al. | |
| 4,239,429 A | 12/1980 | Stoller et al. | |
| 4,264,250 A | 4/1981 | Niggemeier | |
| 4,363,578 A | 12/1982 | Hesch et al. | |
| 4,397,594 A | 8/1983 | Hammonds et al. | |
| 4,407,617 A | 10/1983 | Hammonds et al. | |
| 4,563,117 A | 1/1986 | Krug et al. | |
| 4,723,879 A | 2/1988 | Holt | |
| 4,773,335 A | 9/1988 | Smith et al. | |
| 5,015,131 A | 5/1991 | Schmidt et al. | |
| 5,017,065 A | 5/1991 | Krug et al. | |
| 5,026,229 A | 6/1991 | Matyas et al. | |

(Continued)

*Primary Examiner*—Stephen Gordon
(74) *Attorney, Agent, or Firm*—Armstrong Teasdale LLP (57) ABSTRACT

A retractable stanchion for supporting a semi-trailer during transport on a deck of a railcar is provided. The stanchion includes a rear guide support assembly, a diagonal support strut coupled to said rear guide support assembly, and a vertical support strut operatively connected to said diagonal support strut. The vertical support strut an outer frame, an inner frame, and a moveable pull-up assembly. The outer frame includes an outer frame first end and an outer frame second end. The outer frame first end is pivotally mounted to the deck of the railcar. The inner frame is coupled to and disposed within the outer frame. The moveable pull-up assembly includes a pull-up assembly first end and a pull-up assembly second end, wherein the pull-up assembly first end is pivotally coupled to and substantially disposed within the inner frame, and wherein the pull-up assembly is configured to be engaged by a tractor hook and moved from an engagement position to a pull position. The pull position facilitates rotating the vertical support strut from a first horizontal retracted position to a second vertical erected position.

14 Claims, 6 Drawing Sheets

U.S. PATENT DOCUMENTS

| | | |
|---|---|---|
| 5,054,804 A | 10/1991 | Stewart |
| 5,059,072 A | 10/1991 | Holt |
| 5,112,172 A | 5/1992 | Engle |
| 5,139,374 A | 8/1992 | Holt et al. |
| 5,246,321 A | 9/1993 | Hesch |
| 5,407,309 A | 4/1995 | Hesch et al. |
| 5,452,982 A | 9/1995 | Engle |
| 5,462,394 A | 10/1995 | Engle |
| 5,518,354 A | 5/1996 | Engle |
| 6,452,485 B1 | 9/2002 | Schutt et al. |
| 6,739,611 B2 | 5/2004 | Gisinger et al. |
| 2003/0183033 A1 | 10/2003 | Peveler |
| 2005/0167944 A1 | 8/2005 | Audo et al. |
| 2005/0191147 A1 | 9/2005 | Engle |

* cited by examiner

SECT A-A

APPARATUS AND METHOD FOR SUPPORTING A SEMI-TRAILER ON A RAILCAR

BACKGROUND OF THE INVENTION

This application relates generally to an apparatus for supporting a semi-trailer on a railcar and more particularly, to a retractable stanchion used for supporting a semi-trailer on a deck of a railcar.

At least some known trailer supports, also known as stanchions, are mounted on a railcar deck and are retractable to facilitate loading and/or transportation of various types of storage containers such as, but not limited to, large storage vessels and/or semi-trailers. At least some known retractable stanchions include an engagement portion that is used for moving the retractable stanchion from a horizontal retracted position to a vertical erected position. However, the structure, position, and/or manner in which the engagement portion of the known retractable stanchions is engaged can vary.

At least some known retractable stanchions include an engagement portion that is fixed with respect to an outer frame of the respective stanchion. Therefore, the fixed engagement portion is inhibited from rotation with respect to an outer stanchion frame during an upward movement of the retractable stanchion from a horizontal retracted position to a vertical erected position. Other known retractable stanchions include an engagement portion that is pivotally mounted with respect to an outer stanchion frame. Therefore, similar to the fixed engagement portion, the pivotally mounted engagement portion is also inhibited from rotation with respect to the outer stanchion frame during an upward movement of the retractable stanchion from a horizontal retracted position to a vertical erected position.

These known fixed or pivotally mounted engagement portions may be engaged by manually operated mechanisms and/or machine driven mechanisms to raise the retractable stanchions from a horizontal retracted position to a vertical erected position. For example, a known retractable stanchion may be mounted on a deck of a railcar. The mounted retractable stanchion may initially rest in a horizontal retracted position so that the stanchion will not interfere with a loading of a semi-trailer onto the deck. A tractor and an attached semi-trailer may then be driven up a sloped ramp to move the semi-trailer onto one of a plurality of adjacent railcar decks that may each include a retractable stanchion. Once a semi-trailer kingpin is in predefined loading position, the tractor uses a trailer hook to raise the retractable stanchion to a vertical erected position. The tractor may then transfer the semi-trailer from the tractor to the erected retractable stanchion.

If both the tractor and the semi-trailer are disposed on substantially planar surfaces that are horizontally aligned, then a tractor hook may more easily erect the known retractable stanchions having the conventional fixed or pivotally mounted engagement bar. However, if the tractor is provided on a surface, such as a sloped ramp, lower than a deck top surface in which the semi-trailer is provided, the known retractable stanchion cannot be raised by engaging the conventional fixed or mounted engagement bar because of a vertical displacement of the tractor created by the sloped ramp. Therefore, the vertical displacement between the lower ramp surface and the higher deck surface of the semi-trailer supporting railcar creates a mechanical disadvantage.

BRIEF DESCRIPTION OF THE INVENTION

In one aspect, a retractable stanchion for supporting a semi-trailer during transport on a deck of a railcar is provided. The stanchion includes a rear guide support assembly, a diagonal support strut coupled to the rear guide support assembly, and a vertical support strut operatively connected to the diagonal support strut. The vertical support strut includes an outer frame, an inner frame, and a moveable pull-up assembly. The outer frame includes an outer frame first end and an outer frame second end. The outer frame first end is pivotally mounted to the deck of the railcar. The inner frame is coupled to and disposed within the outer frame. The moveable pull-up assembly includes a pull-up assembly first end and a pull-up assembly second end, wherein the pull-up assembly first end is pivotally coupled to and substantially disposed within the inner frame, and wherein the pull-up assembly is configured to be engaged by a tractor hook and moved from an engagement position to a pull position. The pull position facilitates rotating the vertical support strut from a first horizontal retracted position to a second vertical erected position.

In another aspect, a method for supporting a semi-trailer during transport on a deck of a railcar using a retractable stanchion is provided. The stanchion has a rear guide support assembly, a diagonal support strut coupled to the rear guide support assembly, and a vertical support strut operatively connected to the diagonal support strut. The vertical support strut includes an outer frame, an inner frame positioned within the outer frame, and a moveable pull-up assembly substantially positioned within the inner frame. The method includes pivotally mounting a first end of the outer frame to the deck of the railcar, coupling the inner frame to the outer frame, pivotally coupling a first end of the pull-up assembly to the inner frame, engaging the pull-up assembly while in an engagement position with a tractor hook, and moving the pull-up assembly from the engagement position to a pull position, wherein the pull position facilitates rotating the vertical support strut from a first horizontal retracted position to a second vertical erected position.

In another aspect, a retractable stanchion for supporting a semi-trailer during transport on a deck of a railcar is provided. The stanchion includes a rear guide support assembly, a diagonal support strut coupled to said rear guide support assembly, and a vertical support strut operatively connected to said diagonal support strut, said vertical support strut includes an outer frame and a moveable pull-up assembly. The outer frame has a pair of substantially parallel web members each comprising an outer frame first end and an outer frame second end, wherein the outer frame first end is pivotally mounted to the deck of the railcar. The moveable pull-up assembly includes a pair of substantially parallel arms rotatably coupled to the outer frame and a bar member extending between the parallel arms. The pull-up assembly first end is pivotally coupled to and substantially disposed within the outer frame. The pull-up assembly is configured to be engaged by a tractor hook to facilitate rotating the said vertical support strut from a first horizontal retracted position to a second vertical erected position.

DETAILED DESCRIPTION OF THE INVENTION

The following detailed description is directed to retractable stanchions for use on a railcar. However, it should be appreciated that the description is for ease of understanding and familiarity only, and does not exclude other types of stanchions used to support other types of containers on other types of transportation devices, whether known or later developed.

The exemplary apparatus and methods described herein overcome the mechanical disadvantage of known retractable stanchions used for supporting semi-trailers on a deck of a railcar.

Figure 1:
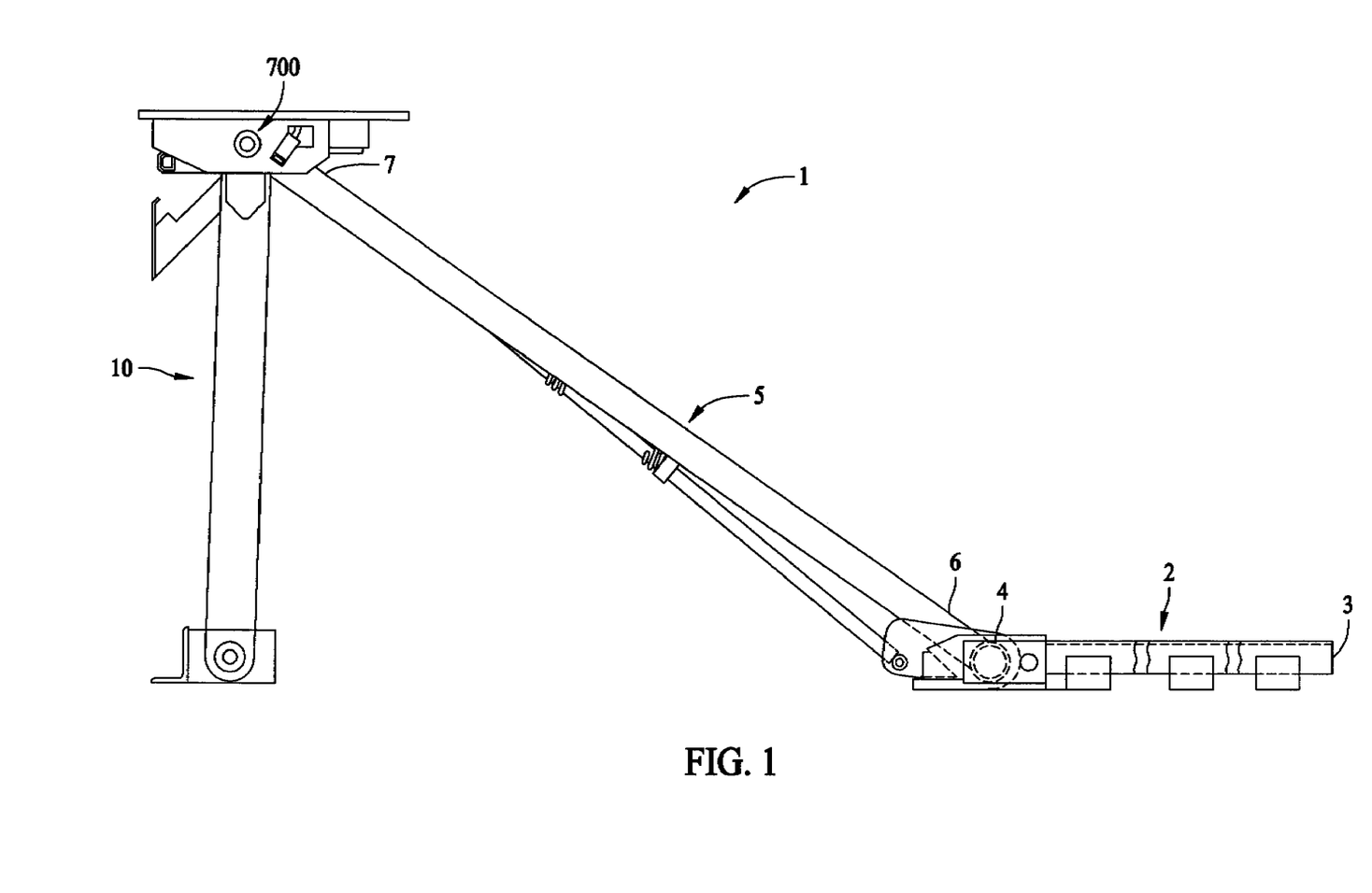
FIG. 1 is a side view of a retractable stanchion 1 in a vertical erected position.

FIG. 1 illustrates a side view of a retractable stanchion 1 in a vertical erected position. As shown in FIG. 1, the retractable stanchion 1 includes a rear guide support assembly 2, a diagonal support strut 5, a vertical support strut 10, and a stanchion head 700 (as described later in detail). The rear guide support assembly 2 includes a first end 3 that may be mounted to a deck of a railcar (as described later in detail) and an opposing second end 4 that is coupled to a first end 6 of the diagonal strut 5. The diagonal strut 5 also includes a second end 7 that is coupled to the stanchion head and operatively coupled to the vertical support strut 10.

Notably, the stanchion 1 may include any known or later developed diagonal strut 5 and rear guide support assembly 2 that facilitate elevation and retraction of the retractable stanchion 1. Further, the diagonal strut 5 and the rear guide support assembly 2 may be coupled to other parts of the stanchion in any known manner. Therefore, the diagonal strut 5 and the rear guide support assembly 2 are not shown in FIGS. 2-7 for ease of understanding the details of the vertical support structure 10.

Figure 2:
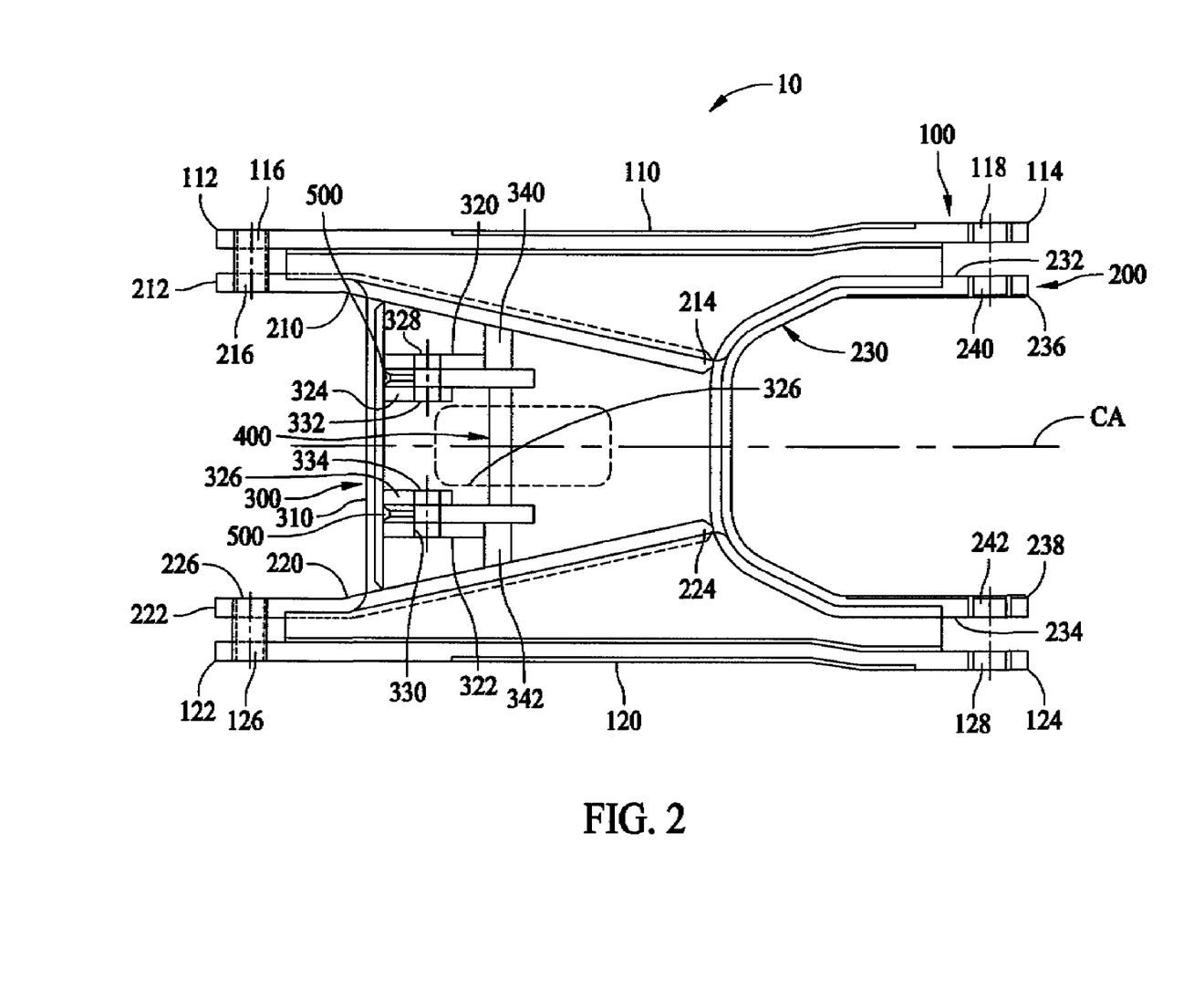
FIG. 2 is a plan view of an exemplary embodiment of a retractable stanchion vertical support strut with a moveable pull-up assembly.

FIG. 2 illustrates a plan view of an exemplary embodiment of the retractable stanchion vertical support strut 10 with a moveable pull-up assembly 400. In the exemplary embodiment, the vertical support strut 10 includes an outer frame 100, an inner frame 200, a moveable pull-up assembly 400, and a plurality of stop members 500.

As shown in FIG. 2, the outer frame 100 includes a pair of substantially parallel leg members 110, 120. The leg members 110, 120 are spaced apart at a first substantially equal distance on opposing sides of a central longitudinal axis CA of the vertical support strut 10. Each leg member 110, 120 includes a first outer frame end 112, 122 and an opposing second outer frame end 114, 124. The first outer frame ends 112, 122 each include a coaxially aligned through-hole 116, 126 for receiving a fastener to pivotally mount the vertical support strut 10 to a deck of a railcar (as described later in detail). The second outer frame ends 114, 124 each include a through-hole 118, 128 for receiving a fastener to pivotally mount a stanchion head (as described later in detail). Both the first outer frame ends 112, 122 and the second outer frame end 114, 124 are coupled to adjacent end portions of the inner frame 200.

The inner frame 200 is disposed coaxial to the central longitudinal axis CA and disposed in an outer frame opening defined between the leg members 110, 120 of the outer frame 100. The inner frame 200 includes a pair of spaced apart elongated members 210, 220 and a substantially u-shaped member 230. Each elongated member 210, 220 includes a first elongated member end 212, 222 and an opposing second elongated member end 214, 224. The first elongated member ends 212, 222 are spaced from and coupled to the adjacent first outer frame ends 112, 122 of the outer frame 100. Therefore, the first elongated member ends 212, 222 each include a through-hole 216, 226 coaxially aligned with the through-holes 116, 126 of the outer frame 100 to receive the fastener used to pivotally mount the vertical support strut 10 to a deck of a railcar. The second elongated member ends 214, 224 are coupled to a portion of the u-shaped member 230.

The u-shaped member 230 includes a pair of substantially parallel portions 232, 234 connected by a c-shaped portion 240 in which the second elongated member ends 214, 224 of the inner frame 200 are coupled. Each parallel portion 232, 234 includes a free end portion 236, 238, respectively. The free end portions 236, 238 are spaced from and positioned adjacent the first outer frame ends 112, 122 of the outer frame 100. Therefore, the free end portions 236, 238 each include a through-hole 240, 242 coaxially aligned with the respective through-hole 118, 128 of the outer frame 100 to receive the fastener used to pivotally mount a stanchion head.

The inner frame 200 also includes an inner support structure 300 for supporting the moveable pull-up assembly 400. The inner support structure 300 includes a crossbar 310, a plurality of substantially parallel web members, and a plurality of free end supports 340, 342. The crossbar 310 is coupled between the elongated members 210, 220 at a position adjacent to the first elongated member ends 212, 222 of the inner frame 200. The crossbar 310 is also disposed substantially perpendicular to the substantially parallel leg members 110, 120 of the outer frame 100.

The web members include a pair of outer web members 320, 322 and a pair of inner web members 324, 326 that are positioned between the outer web members 320, 322. The outer web members 320, 322 and the inner web members 324, 326 are disposed in an enclosed inner frame opening defined by the crossbar 310 and the elongated members 210, 220 of the inner frame 200. The outer web members 320, 322 and the inner web members 324, 326 are also substantially parallel to the leg members 110, 120 of the outer frame 100. Further, the inner web members 324, 326 are spaced from and positioned adjacent the outer web members 320, 322. Therefore, each of the outer web members 320, 322 and the inner web members 324, 326 include a respective through-hole 328, 330, 332, 334 that is coaxially aligned with the through-holes 118, 128 of the outer frame 100 for receiving fasteners used to rotatably mount and support the moveable pull-up assembly 400.

The free end supports 340, 342 are also coupled to an inner surface of the elongated members 210, 220 to support the moveable pull-up assembly 400. The free end supports 340, 342 are spaced from the crossbar 310 and disposed substantially perpendicular to the substantially parallel leg members 110, 120 of the outer frame 100. Therefore, the free end supports 340, 342 are used to support the moveable pull-up assembly 400 in a horizontal retracted position of the vertical support strut 10, support the moveable pull-up assembly 400 in an engagement position of the moveable pull-up assembly 400, and control rotational movement of a free end of the moveable pull-up assembly 400, as later described in further detail.

As shown in FIG. 2, the stop members 500 are also used to control rotational movement of the free end of the moveable pull-up assembly 400. Each stop member 500 is disposed between one outer web member 320, 322 and one adjacent inner web member 324, 326. One stop member 500 is disposed between the outer web member 320 and the inner web member 324. Another stop member 500 is disposed between outer web member 322 and the inner web member 326. Although two stop members 500 are shown in exemplary embodiment of the vertical support strut 10, it should be appreciated that only one stop member 500 may be provided to control the angular orientation of the moveable pull-up assembly 400.

Figure 3:
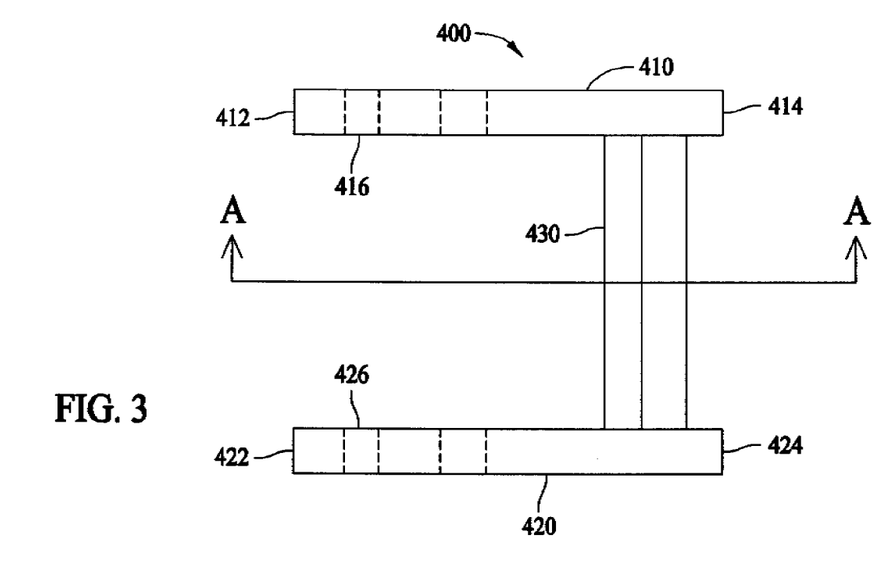
FIG. 3 is a plan view of the moveable pull-up assembly shown in FIG. 2.
Figure 4:
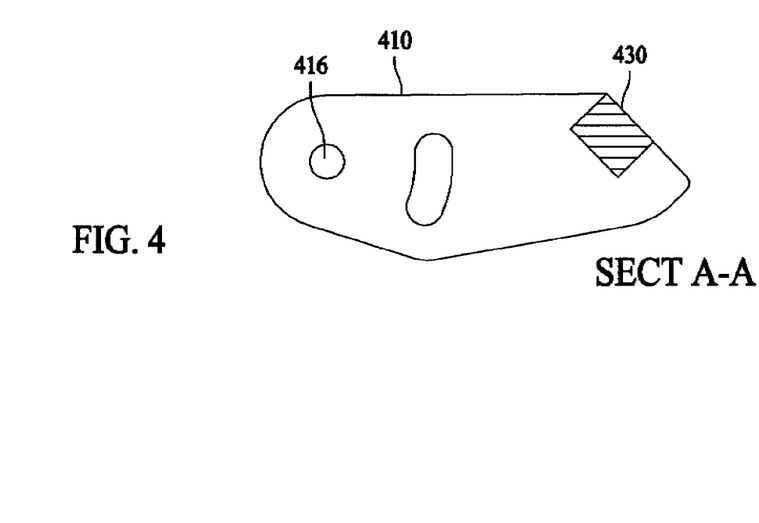
FIG. 4 is a cross-sectional view of the moveable pull-up assembly as taken along line A-A in FIG. 3.

FIG. 3 is a plan view of the moveable pull-up assembly 400. FIG. 4 is a cross-sectional view of the moveable pull-up assembly 400 as taken along line A-A in FIG. 3. As shown in FIGS. 3 and 4, the moveable pull-up assembly 400 includes a pair of substantially parallel arms 410, 420 and a bar member 430 extending between the arms 410, 420. Each of the arms 410, 420 include a first bar end 412, 422 and an opposing free end 414, 424, respectively.

As shown in FIG. 2, the first bar ends 412, 422 are positioned between one of the outer web members 320, 322 and the respective adjacent inner web member 324, 326 of the inner support structure 300 of the inner frame 200. Therefore, as shown in FIGS. 2, 3, and 4, the first bar ends 412, 422 each include a coaxially aligned through-hole 416, 426 for receiving a fastener to rotatably mount the moveable pull-up assembly 400 to the inner frame 200.

Figure 5:
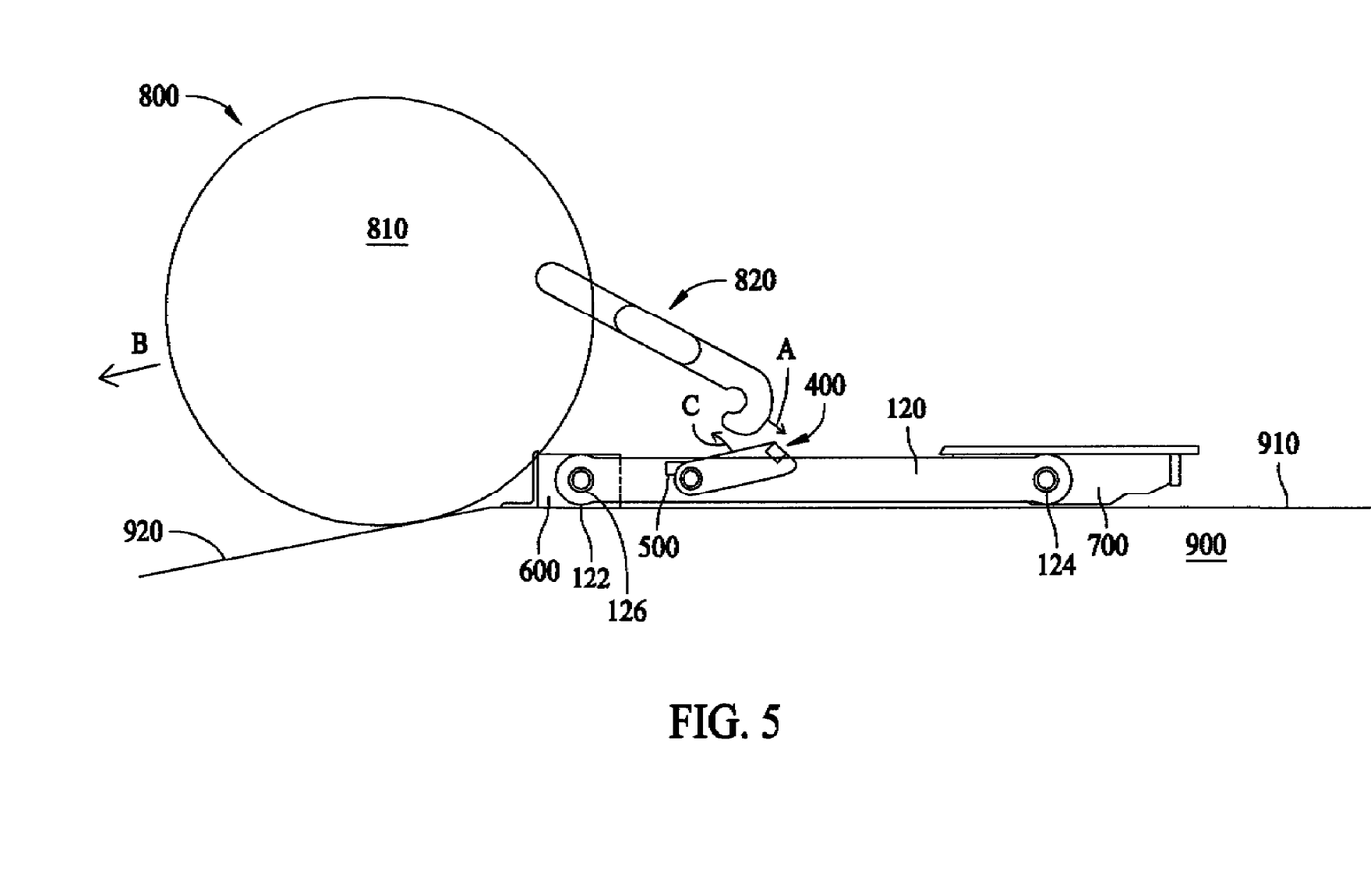
FIG. 5 is a side view of the vertical strut shown in FIG. 2 in a horizontal retracted position with the moveable pull-up assembly in an engagement position.
Figure 6:
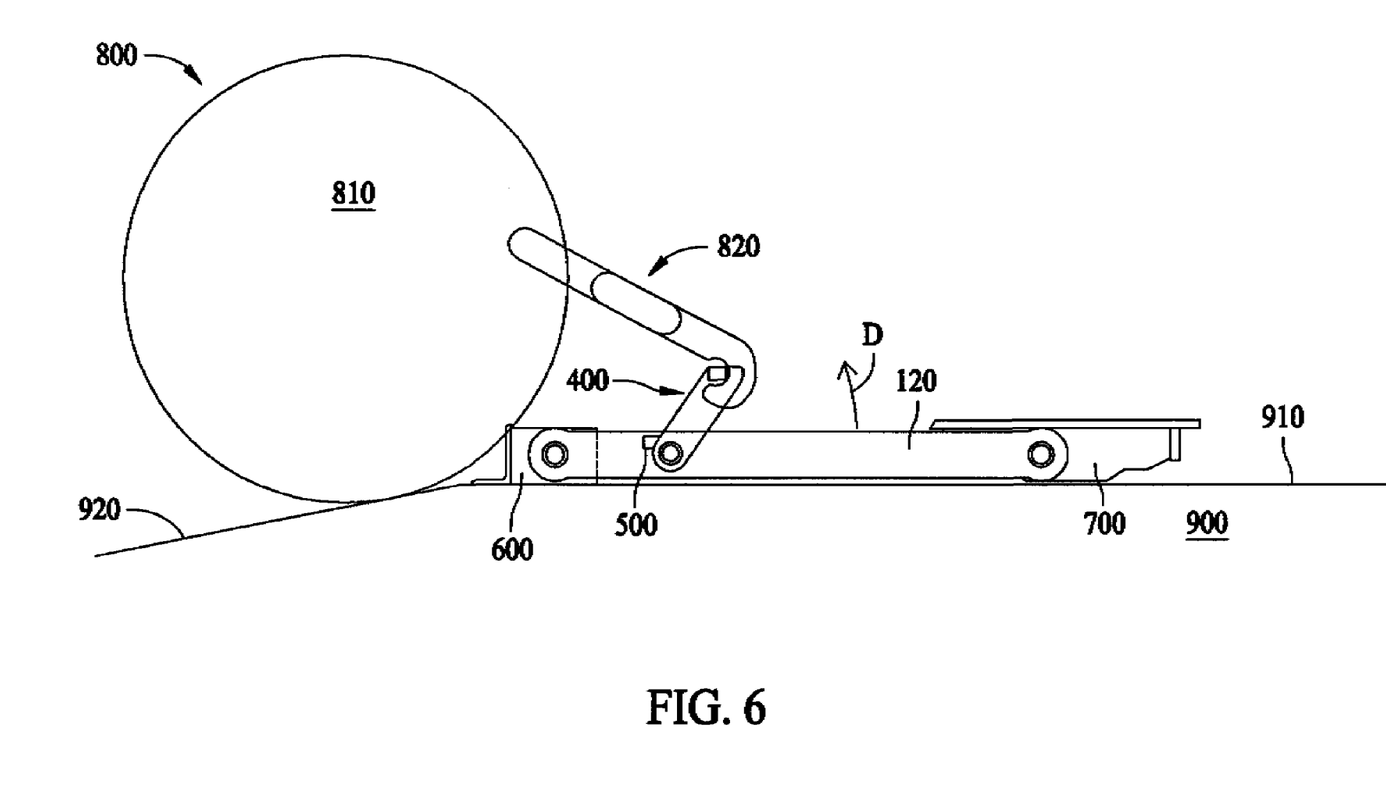
FIG. 6 is a side view of the retractable stanchion shown in FIG. 1 in a horizontal retracted position with the moveable pull-up assembly in a pull-position.
Figure 7:
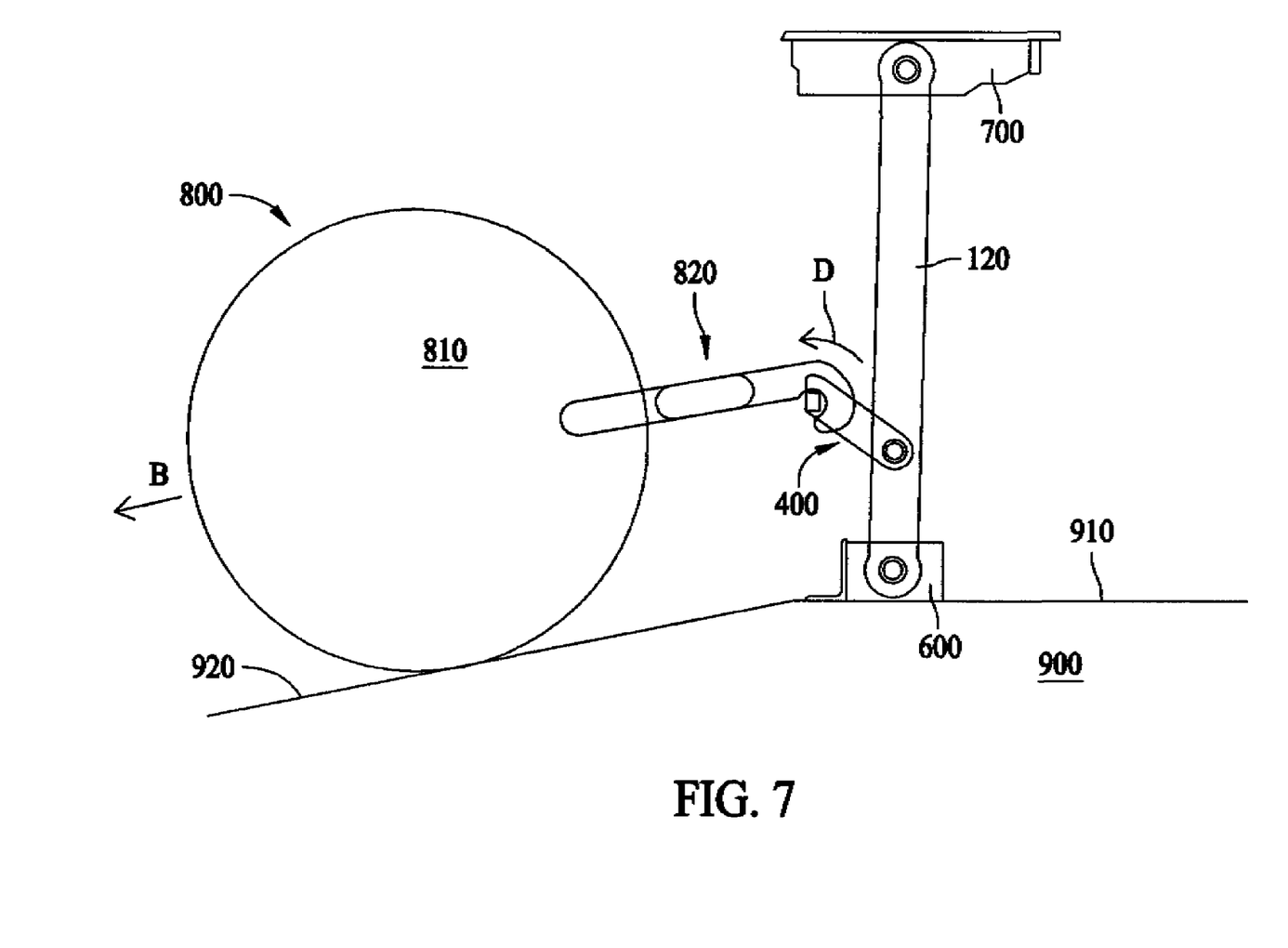
FIG. 7 is a side view of the retractable stanchion shown in FIG. 1 in a vertical erected position with the moveable pull-up assembly in the pull-position.

An exemplary method for operating elevating and retracting the vertical support strut 10 of the retractable stanchion 1 is discussed below with reference to FIGS. 5 through 7. FIG. 5 is a side view of the vertical support strut 10 in a horizontal retracted position with the moveable pull-up assembly 400 in an engagement position. FIG. 6 is a side view of the vertical support strut 10 shown in FIG. 2 in a horizontal retracted position with the moveable pull-up assembly 400 in a pull position. FIG. 7 is a side view of the vertical support strut 10 in a vertical erected position with the moveable pull-up assembly 400 in the pull position. The pivotal and rotational mountings are described with reference to one central longitudinal axis CA side of the vertical support strut 10 in FIGS. 5-7 for ease of understanding. However, it should be appreciated that similar mountings are made on the other central longitudinal axis CA side.

In the exemplary embodiment shown in FIG. 5, the vertical support strut 10 includes a fixed end, a free end, and an intermediate section located between the fixed end and the free end. At the fixed end, the vertical support strut 10 is pivotally mounted to a deck 900 of a railcar. For example, the first outer frame end 122 of the leg member 120 is mounted to a deck mount 600 via a first fastener provided in the through-hole 126. The fastener also extends through the through-hole 226 that is provided at the first elongated member end 222 of the elongated member 220 of the inner frame 200.

At the free end, the vertical support strut 10 is pivotally mounted to the stanchion head 700. For example, the second outer frame end 124 of the leg member 120 is pivotally mounted to the stanchion head 700 via a second fastener provided in the through-hole 128. The second fastener also extends through the through-hole 242 that is provided at the free end portion 238 of the u-shaped member 230 of the inner frame 200.

At the intermediate section, the moveable pull-up assembly 400 is rotatably mounted to the inner support structure 300 of the inner frame 200. For example, the first bar end 422 of the arm 420 is pivotally mounted between the outer and the inner web members 322, 326 of the inner frame 200 via a third fastener provided in the through hole 426.

As shown in FIG. 5, the vertical support strut 10 is in the horizontal retracted position in which the outer frame 100 and the inner frame 200 rest substantially parallel to a top surface 910 of the deck 900. However, in the horizontal retracted position of the vertical support strut 10, the moveable pull-up assembly 400 may also be rotated from an engagement position to a pull position.

In the engagement position shown in FIG. 5, the moveable pull-up assembly 400 is orientated substantially parallel to the top surface 910 of the deck 900. The moveable pull-up assembly 400 is also substantially positioned within the inner frame opening defined by the crossbar 310 and the elongated members 210, 220 of the inner frame 200. Further, the arms 410, 420 of the moveable pull-up assembly 400 are supported by the respective free end supports 340, 342 of the inner frame 200.

In the pull position shown in FIG. 6, the moveable pull-up assembly 400 is orientated at a different angle relative to the top surface 910 of the deck 900. The moveable pull-up assembly 400 is also substantially positioned outside of the inner frame opening defined by the crossbar 310 and the elongated members 210, 220 of the inner frame 200. For example, the free end 424 of the arm 420 is entirely rotated outside of the inner frame opening. The free end 424 is also positioned at a different angular orientation that is limited by the stop member 500. Further, the arms 410, 420 of the moveable pull-up assembly 400 are no longer supported by the respective free end supports 340, 342 of the inner frame 200.

An exemplary loading of a semi-trailer onto the deck 900 of a railcar using the exemplary retractable stanchion 1 including the vertical support strut 10 is described herein.

During loading of a semi-trailer (not shown), a tractor 800 and the attached semi-trailer are driven onto the deck 900 of a railcar. The deck 900 is shown to include a sloped ramp 920 that facilitates positioning of the semi-trailer onto the top surface 910 of the deck 900. However, it should be appreciated that sloped ramp 920 may be any integral or separate structure that allows the semi-trailer to be driven onto the top surface 910.

After the semi-trailer is positioned in a loading position, the tractor 800 is used to raise the vertical support strut 10 from the horizontal retracted position shown in FIG. 5 to the vertical erected position shown in FIG. 7. As shown in FIG. 5, the tractor 800 includes a tractor hook 820 disposed adjacent a rear wheel 810 of the tractor 800. With the vertical support strut 10 in the retracted position and the moveable pull-up assembly 400 in the engagement position, the tractor hook 820 is lowered in a direction A to engage the bar 430 of the moveable pull-up assembly 400. After the bar 430 is engaged by the tractor hook 820, the moveable pull-up assembly 400 is moved from the engagement position toward the pull position by driving the tractor 800 forward in a direction B to rotate the moveable pull-up assembly 400 in a direction C.

As shown in FIG. 6, the moveable pull-up assembly 400 is rotated to the pull position in which the first bar end 422 of the arm 420 engages the stop member 500. The stop member 500 limits further rotation of the arm 420 in the direction C. Therefore, in the pull position, the moveable pull-up assembly 400 is at a fixed angular position with respect to the outer frame 100 and the inner frame 200. After the moveable pull-up assembly 400 is in the pull position, the moveable pull-assembly 400 is moved from the horizontal retracted position toward the vertical erected position by further driving the tractor 800 forward in the direction B to pivot and raise the vertical support strut 10 in a direction D.

As shown in FIG. 7, the vertical support strut 10 is pivoted to the vertical erected position in which the outer frame 100 and the inner frame 200 are orientated substantially perpendicular to the top surface 910 of the deck 900. In the vertical erected position, the outer frame 100, the inner frame 200, and the moveable pull-up assembly 400 of the vertical support strut 10 are elevated from the top surface 910 of the deck 900. Also, a top surface of the stanchion head 700 remains substantially parallel to the top surface 910 of the deck 900 to support a kingpin of the semi-trailer.

Although the fasteners describes above have not been specifically described, it should be appreciated that any type of fastener such as, but not limited to a pivot pin, may be used provided that the fastener facilitates pivotal or rotational movement of the various features where such pivoting or rotation has been described.

Although the retractable stanchion 1 including the vertical support strut 10 is described as supporting a semi-trailer, the retractable stanchion 1 is not limited to supporting such a storage container. Rather, the retractable stanchion 1 may be used to support any other structure such as, but not limited to a transportation platform, a transportation container, a storage vessel, a hopper or other similar types of large storage structures.

The above-described exemplary retractable stanchion including the vertical support strut and the exemplary method for moving the retractable stanchion including the vertical support strut facilitate restoration of a mechanical advantage that allows the retractable stanchion to be raised. Specifically, such exemplary embodiments allow the retractable stanchion to be raised even when a tractor is positioned on a lower slope having an angle of at least approximately 6 degrees with respect to an upper surface of an adjacent horizontally disposed railcar deck. As a result, the retractable stanchion and the method facilitate raising the vertical support strut of the stanchion in a time-saving manner.

Exemplary embodiments of the retractable stanchion including the vertical support strut and the method for moving the retractable stanchion including the vertical support strut are described above. However, the exemplary embodiments are not limited to the specific embodiments described herein, but rather, features of the embodiments may vary in size, shape, dimension, and structure provided that the features facilitate the mechanical advantage of allowing including the vertical support strut of the retractable stanchion to be raised when a tractor is supported on a lower platform than the semi-trailer.

While the invention has been described in terms of various specific embodiments, those skilled in the art will recognize that the invention can be practiced with modification within the spirit and scope of the claims.

What is claimed is:

1. A retractable stanchion for supporting a semi-trailer during transport on a deck of a railcar, said stanchion comprising:
    a rear guide support assembly;
    a diagonal support strut coupled to said rear guide support assembly; and
    a vertical support strut operatively connected to said diagonal support strut, said vertical support strut comprises:
        a frame being pivotally mounted at a first end to the deck of the railcar and having a second end configured for coupling to a stanchion head; and
        a moveable pull-up assembly comprising a pull-up assembly first end and a pull-up assembly second end, said pull-up assembly first end pivotally coupled to and substantially disposed within said frame, said pull-up assembly second end spaced a distance from said pull-up assembly first end toward said second end of said frame, wherein said pull-up assembly is configured to be engaged by a tractor hook and rotated from an engagement position away from said frame to a pull position, wherein the pull position facilitates rotating said vertical support strut from a first horizontal retracted position to a second vertical erected position.

2. A retractable stanchion in accordance with claim 1 wherein said frame of said vertical support strut further comprises:
    an outer frame comprising an outer frame first end and an outer frame second end, said outer frame first end being pivotally mounted to the deck of the railcar; and
    an inner frame coupled to and disposed within said outer frame,
    wherein said moveable pull-up assembly first end is pivotally coupled to and substantially disposed within said inner frame.

3. A retractable stanchion in accordance with claim 2 wherein said inner frame defines an opening for receiving said pull-up assembly.

4. A retractable stanchion in accordance with claim 3 wherein, in the engagement position, said pull-up assembly second end is substantially disposed within said opening.

5. A retractable stanchion in accordance with claim 3 wherein, in the pull position, said pull-up assembly second end is substantially disposed outside of said opening.

6. A retractable stanchion in accordance with claim 1 wherein, in the engagement position, said pull-up assembly facilitates rotation of said pull-up assembly to the pull position and facilitates rotation of said vertical support strut from the first horizontal retracted position to the second vertical erected position.

7. A retractable stanchion in accordance with claim 1 wherein said pull-up assembly comprises a pair of substantially parallel arms rotatably coupled to said inner frame and a bar member extending between said parallel arms.

8. A retractable stanchion in accordance with claim 1 further comprising a stop member coupled to said inner frame, said stop member configured to prevent further rotation of said pull-up assembly when said pull assembly is in the pull position.

9. A retractable stanchion in accordance with claim 2 wherein said pull-up assembly further comprises a pair of substantially parallel arms extending between the pull-up assembly first and second ends, and a member extending between the pair of arms adjacent to the pull-up assembly second end.

10. A retractable stanchion in accordance with claim 1 wherein said frame of said vertical support strut comprises:
    an outer frame comprising a pair of substantially parallel web members, each web member comprising an outer frame first end and an outer frame second end, said outer frame first end being pivotally mounted to the deck of the railcar; and
    said moveable pull-up assembly comprising a pair of substantially parallel arms rotatably coupled to said outer frame and a bar member extending between said parallel arms, said pull-up assembly first end pivotally coupled to and substantially disposed within said outer frame.

11. A retractable stanchion in accordance with claim 10 wherein said outer frame defines an opening for receiving said pull-up assembly.

12. A retractable stanchion in accordance with claim 11 wherein said pull-up assembly second end is substantially disposed within said opening when said pull-up assembly is in the engagement position.

13. A retractable stanchion in accordance with claim 11 wherein said pull-up assembly second end is substantially disposed outside of said opening when said pull-up assembly is in the pull position, wherein the pull position locates the bar member of said pull-up assembly to facilitate rotating said vertical support strut from the first horizontal retracted position to the second vertical erected position.

14. A retractable stanchion in accordance with claim 1 wherein said moveable pull-up assembly is rotatable relative to said frame in a direction away from the deck of the railcar from the engagement position to the pull position, wherein in the engagement position said pull-up assembly is disposed substantially within said frame, and wherein in the pull position said pull-up assembly is disposed substantially outside of said frame.

* * * * *